US010587951B1

(12) United States Patent
Schaffer et al.

(10) Patent No.: US 10,587,951 B1
(45) Date of Patent: Mar. 10, 2020

(54) EQUIPMENT INCLUDING DOWN-FIRING SPEAKER

(71) Applicant: Plantronics, Inc., Santa Cruz, CA (US)

(72) Inventors: John A. Schaffer, Albany, CA (US); Jacob T Meyberg Guzman, Santa Cruz, CA (US); John S Graham, Scotts Valley, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 16/130,839

(22) Filed: Sep. 13, 2018

(51) Int. Cl.
*H04R 1/30* (2006.01)
*H04R 1/34* (2006.01)
*H04R 27/00* (2006.01)

(52) U.S. Cl.
CPC .............. *H04R 1/345* (2013.01); *H04R 1/30* (2013.01); *H04R 27/00* (2013.01)

(58) Field of Classification Search
CPC . H04R 1/30; H04R 1/345; H04R 3/02; H04R 5/02; H04R 27/00; H04R 1/24
USPC .......... 379/388.2; 381/17, 26, 71.1, 92, 150, 381/152, 160, 332, 346, 386, 104, 341, 381/342, 388; 455/567; 181/182, 187, 181/192; 700/94
See application file for complete search history.

(56) References Cited

U.S. PATENT DOCUMENTS

| 4,620,317 | A | * | 10/1986 | Anderson | H04R 1/345 |
| | | | | | 181/155 |
| 5,715,319 | A | * | 2/1998 | Chu | H04R 3/005 |
| | | | | | 381/26 |
| 10,038,954 | B2 | | 7/2018 | Voishvillo | |
| 10,051,353 | B2 | * | 8/2018 | Robison | H04R 1/2857 |
| 10,157,604 | B1 | * | 12/2018 | Carter | G10K 11/175 |
| 2002/0038740 | A1 | * | 4/2002 | Ureda | H04R 1/30 |
| | | | | | 181/187 |
| 2002/0193896 | A1 | * | 12/2002 | Bull | H04R 1/2849 |
| | | | | | 700/94 |
| 2003/0059061 | A1 | * | 3/2003 | Tsuji | H04M 3/569 |
| | | | | | 381/92 |
| 2003/0209384 | A1 | * | 11/2003 | Dalbec | G10K 11/025 |
| | | | | | 181/182 |
| 2004/0209654 | A1 | * | 10/2004 | Cheung | H04S 1/00 |
| | | | | | 455/567 |
| 2005/0008173 | A1 | * | 1/2005 | Suzuki | H04R 1/345 |
| | | | | | 381/160 |

(Continued)

FOREIGN PATENT DOCUMENTS

WO 2007005619 A2 1/2007

OTHER PUBLICATIONS

Cetacea Sound Ensemble Portable Speaker System, downloaded from https://www.cetaceasound.com/ensemble on Aug. 13, 2018, 7 pages.

(Continued)

*Primary Examiner* — Gerald Gauthier
(74) *Attorney, Agent, or Firm* — Haynes Beffel & Wolfeld LLP

(57) ABSTRACT

A desktop device comprises a housing having a bottom side configured to face a surface on which the device is to be placed, such as a desktop, and a front side configured to face a user of the device. A down-firing speaker is placed inside the housing. A speaker port is disposed on the bottom side of the housing. A horn assembly on the housing is arranged to define a speaker horn in combination with the surface on which the device is placed.

19 Claims, 3 Drawing Sheets

(56) References Cited

U.S. PATENT DOCUMENTS

| | | | | |
|---|---|---|---|---|
| 2005/0276432 A1* | 12/2005 | Hsieh | ............. | H04R 1/345 381/341 |
| 2006/0086562 A1* | 4/2006 | Ferrell | ............. | H04R 27/00 181/187 |
| 2007/0003097 A1* | 1/2007 | Langberg | ............. | H04R 5/02 381/386 |
| 2007/0036369 A1* | 2/2007 | Davi | ............. | H04R 1/023 381/150 |
| 2007/0263845 A1* | 11/2007 | Hodges | ............. | H04R 1/345 379/388.02 |
| 2009/0196428 A1* | 8/2009 | Kim | ............. | H04R 3/04 381/17 |
| 2010/0006367 A1* | 1/2010 | Bartlett | ............. | G10K 11/025 181/187 |
| 2011/0069856 A1* | 3/2011 | Blore | ............. | G10K 11/025 381/338 |
| 2011/0188679 A1* | 8/2011 | Lee | ............. | H04R 1/00 381/152 |
| 2011/0194719 A1* | 8/2011 | Frater | ............. | H04R 27/00 381/332 |
| 2012/0213387 A1* | 8/2012 | Blore | ............. | H04R 1/30 381/104 |
| 2013/0163800 A1* | 6/2013 | Yamasaki | ............. | H04R 1/2842 381/332 |
| 2013/0301862 A1* | 11/2013 | Adamson | ............. | H04R 1/025 381/332 |
| 2014/0270309 A1* | 9/2014 | McKinnon | ............. | H04R 1/323 381/342 |
| 2015/0000998 A1* | 1/2015 | McKinnon | ............. | G10K 11/26 181/192 |
| 2015/0237424 A1* | 8/2015 | Wilker | ............. | H04R 1/026 381/150 |
| 2015/0365762 A1* | 12/2015 | Truon | ............. | H04R 3/005 381/71.1 |
| 2017/0026750 A1* | 1/2017 | Mansfield | ............. | H04R 5/02 |
| 2017/0150251 A1* | 5/2017 | Baggs | ............. | H04R 1/26 |
| 2018/0359559 A1* | 12/2018 | Bisset | ............. | H04R 1/32 |
| 2018/0376240 A1* | 12/2018 | Brousseau | ............. | H04R 1/24 |
| 2019/0222925 A1* | 7/2019 | Ha | ............. | H04R 1/30 |
| 2019/0222926 A1* | 7/2019 | Showalter | ............. | H04R 27/00 |

OTHER PUBLICATIONS

Plantronix Calisto 800 Series P820-M/P825-M/P830-M/P835-M User Guide, as early as Jan. 2011, 34 pages.

Powstro Bamboo Desktop Speaker Stand Amplifier Dock, downloaded from https://amazon.com/powstro-bamboo-desktop-speaker-amplifier on Aug. 13, 2019, 6 pages.

* cited by examiner

EQUIPMENT INCLUDING DOWN-FIRING SPEAKER

BACKGROUND

Field

The present invention relates to desktop equipment that includes a speaker, such as a desktop speaker phone.

Description of Related Art

Desktop equipment is often configured with a speaker or speakers. It is desirable that the area on the desktop taken by such equipment be as small as possible. One approach to reducing the area includes down-firing speakers on the underside of the equipment. In this way, elements of the equipment such as the user interface, an electronics module and the speaker can be stacked, reducing the overall footprint of the equipment.

A down-firing speaker in prior art equipment directs sound energy towards the desktop surface or other deflecting surface, causing it to disperse outwardly into the room. This can result in the sound being dispersed with undesirable patterns and directions. Accordingly, to account for this type of dispersion, high-power drivers are required in order to reach desired volume levels for users of the device.

It is desirable to provide a technology for improving the audio characteristics of equipment including down-firing speakers.

SUMMARY

A desktop device such as a speaker phone is described herein that comprises a housing having a bottom side configured to face a surface on which the device is to be placed, such as a desktop, and a front side configured to face a user of the device. A down-firing speaker is placed on the housing, where "on the housing" includes being inside or otherwise attached to or part of the housing. A speaker port is disposed on the bottom side of the housing. A horn assembly on the housing is arranged to define a speaker horn in combination with the surface on which the device is placed. The speaker horn formed by this combination has a throat region proximal to the speaker port and a mouth proximal to the front side of the housing.

The horn assembly is arranged in examples described herein so that the speaker horn has a substantially continuously increasing volume from the throat region to the mouth. The horn assembly can comprise first and second sidewalls on the housing having proximal ends proximal to the speaker port and distal ends proximal to the mouth of the speaker horn. The first and second sidewalls in one described example are separated by first width W1 proximal to the speaker port, and separated by a second width W2 proximal to the mouth, where W2 is greater than W1. Also, the first and second sidewalls have a first height H1 proximal to the speaker port, and a second height H2 proximal to the mouth, where H2 is greater than H1.

In an example described herein, the speaker comprises a diaphragm and a phase plug. The phase plug has an aperture or apertures opening into the speaker port. A ring is used in some embodiments, disposed in the speaker port around a perimeter of the phase plug, the ring having a smooth outside surface defining an inside wall of the horn assembly at the speaker port.

In some types of equipment, a microphone is disposed in the housing, which includes a microphone port, which can open on the bottom side of housing. The microphone port can be located in a position spaced laterally away from the horn assembly so that dispersion of acoustic energy in air from the speaker is diverted from this microphone port by a sidewall of the horn assembly.

Other aspects and advantages of the present invention can be seen on review of the drawings, the detailed description and the claims, which follow.

DETAILED DESCRIPTION

A detailed description of embodiments of the present invention is provided with reference to the FIGS. 1-4.

Figure 1:
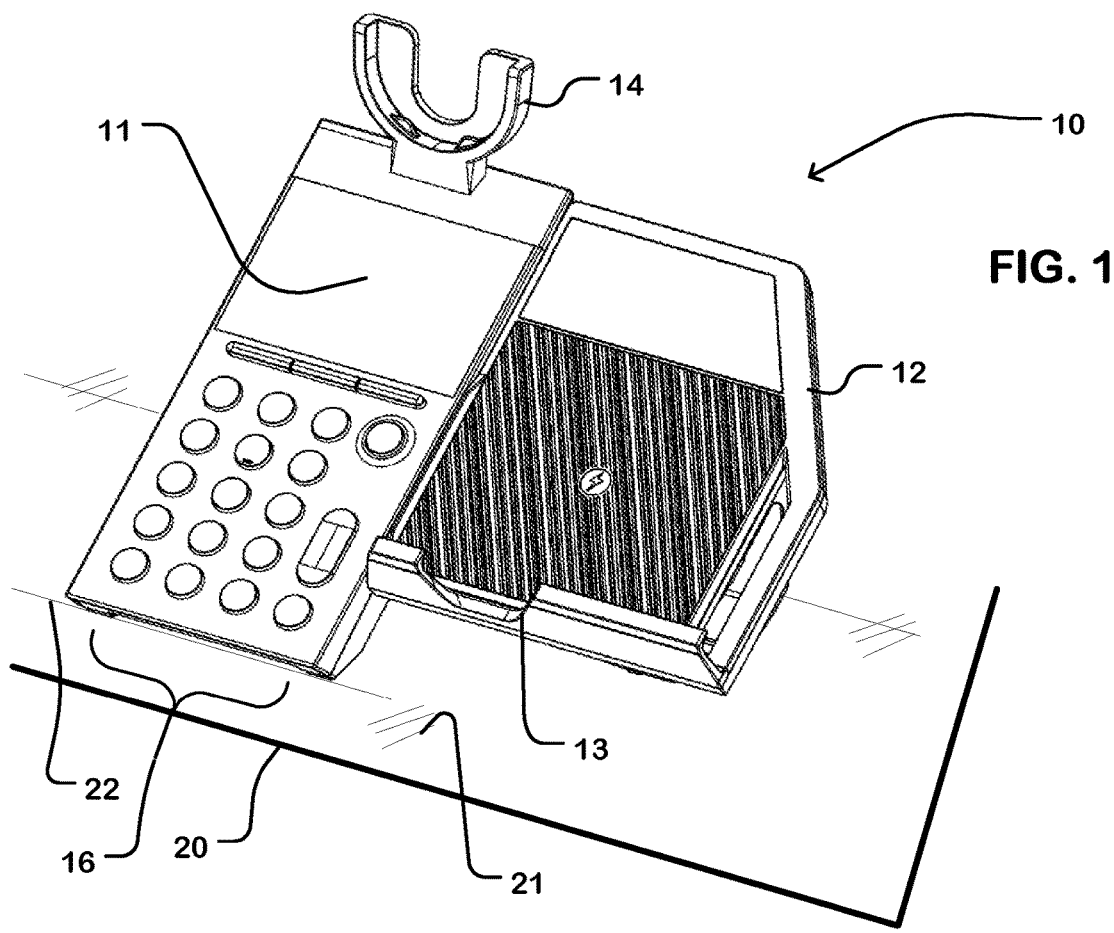
FIG. 1 is a drawing of a speaker phone having a down-firing speaker with a horn assembly having a mouth facing a user of the speakerphone.

FIG. 1 illustrates device 10, which is representative of a variety of desktop equipment which can be configured as described herein with a down-firing speaker and horn assembly. The desktop equipment can include electronic circuitry to apply signals to the speaker. In the case of device 10, a speakerphone as illustrated, in which the electronic circuitry supports telephone functions. Other types of equipment can include electronic circuitry that supports other functions that use the speaker, including simply circuits to apply signals from any source to the speaker. In examples of the device, electronics are disposed on the housing typically in an electronics module or circuit board, including a speaker driver electronically connected to the speaker and other supporting circuits.

In the illustrated example, the device 10 includes a housing having a first upwardly facing portion 11 and a second upwardly facing portion 12. In this example, the first upwardly facing portion 11 has a user interface with buttons and a display region. In this example, the second upwardly facing portion 12 includes a tray configured to receive a mobile computing device. In the portion 12, the tray can include a cutout portion 13 allowing space for charging cables or other cords. Also in the example illustrated, the device 10 includes a cradle 14 configured to hold a headset.

The device 10 in this example includes a telephone having a microphone disposed in a microphone port and a down-firing speaker disposed in a speaker port that opens into a horn assembly on the housing of the device. Also, the device can be coupled to a telephone by a wireless connection, by a cord, or in other ways, such as in the case of a mobile phone in the tray on portion 12 of the housing.

In FIG. 1, a desktop 20 is illustrated having a surface 21 on which the device 10 is placed. Of course, the surface 21 need not be the surface of the desk, but can be any surface on which the device can be placed.

The device 10 has a bottom side that is configured to face the surface 21. Also, the device has a front side which is configured to face a user of the device.

The housing of the device 10 includes a horn assembly on the bottom side, which in combination with the surface 21 forms a speaker horn having a mouth 16 as seen in FIG. 1 proximal to the front side of the device 10. The mouth 16 comprises an opening as defined by sidewalls of a horn assembly on the bottom side of the device 10, and the portion 22 of the surface 21 on which the device 10 is placed, and which combines with the horn assembly on the bottom side of the device to form a speaker horn.

In this example, the down-firing speaker is disposed beneath the portion 11 of the device 10 in which the user interface is disposed. Likewise, the horn assembly extends beneath the first portion 11 from a speaker port on the bottom side of the equipment to the mouth 16. In other embodiments, the positions of these elements are arranged as suits a particular configuration.

Figure 2:
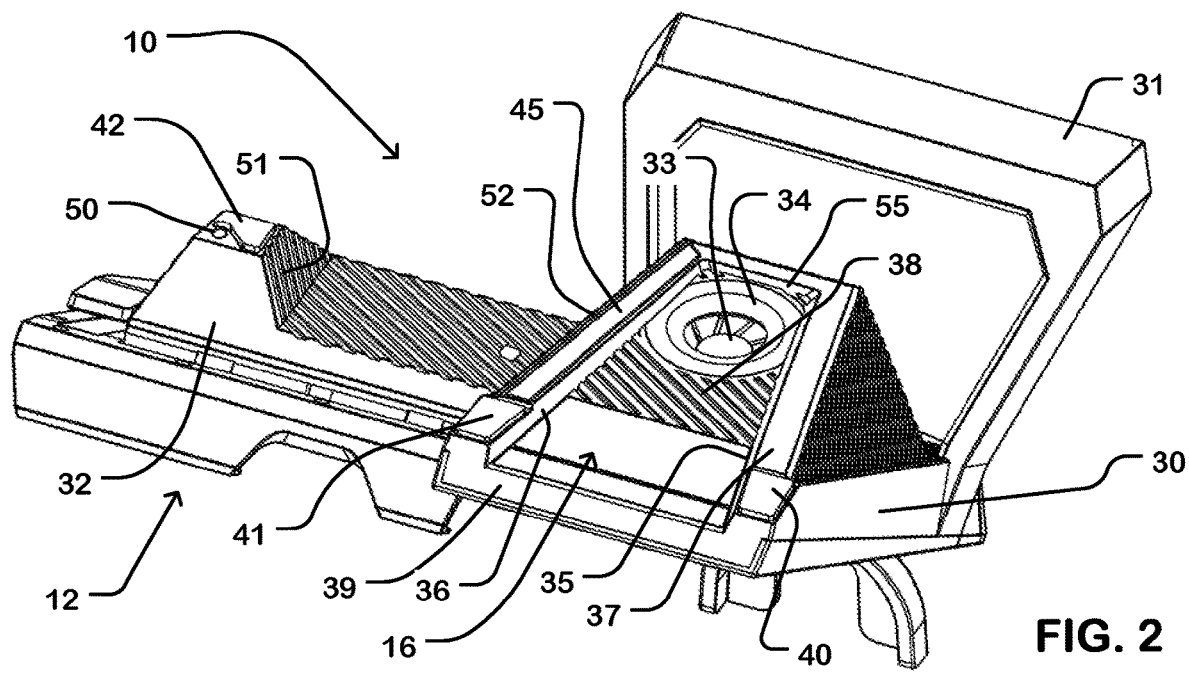
FIG. 2 is a view of the bottom side of the equipment shown in FIG. 1, illustrating a speaker horn assembly and microphone port.

FIG. 2 is a perspective view of the device 10 shown in FIG. 1 rotated 180° in a clockwise direction to reveal the bottom side of the housing. In this example, the device 10 includes a bridge-shaped foot 31 coupled to the housing 30, configured to support the device on a surface 21.

A speaker port 33 opens into a horn assembly on the bottom side. The horn assembly includes a first sidewall 35 and a second sidewall 36, a back wall 55, and a downwardly facing surface 38 which, in combination with the surface on which the device is placed, provide a speaker horn having a throat region proximal to the speaker port 33 and a mouth 16 at the front side of the device. In the illustrated example, the downwardly facing surface 38 of the horn assembly is corrugated along a portion proximal to the speaker port and smooth along a portion proximal to the mouth 16 of the horn assembly. In other embodiments, the downwardly facing surface can be smooth and flat on a majority of its area or all of its area. Other surface textures can be used for cosmetic purposes or other purposes.

A front portion 39 of the housing adjacent the mouth 16 of the horn assembly defines a front side of the device.

First and second surface pads 40, 41 are disposed proximal to the mouth 16 of the horn assembly on the downwardly facing surfaces of the first and second sidewalls 35, 36, to support contact to the surface on which the device is placed. The downwardly facing surface of the sidewall 36 also includes a surface pad 45, to support contact with the surface on which the device is placed. The surface pad 45 can be configured to contact the surface along a majority of its length from the throat region to the mouth of the horn assembly.

Also, the bottom side of the device 10 includes a leg 32, in this example beneath the portion 12. A microphone port 50 is disposed on the leg 32, in this example, spaced away from the horn assembly. The leg has a sidewall 51, that faces an opposing sidewall 52 on the housing module supporting the speaker and the horn assembly on the underside of the device 10. The sidewalls 51 and 52, along with the position of the microphone port laterally spaced away from the horn assembly, are configured so that dispersion of acoustic energy in air from the speaker is diverted from the microphone port by a sidewall of the horn assembly, serving to reduce coupling of sound from the speaker into the microphone port.

A surface pad 42 is disposed on the downwardly facing portion of the leg 32, and can comprise a material that absorbs sound or conforms to the surface to dampen coupling of audio signals from the surface and from air into the microphone port 50.

The surface pad 45 on the downwardly facing surface of sidewall 36 can comprise a material that can absorb sound or conform to the surface, and reduce coupling of sound via air in the direction towards the leg 32.

Surface pads are not provided on one or both of the downwardly facing surface 37 of the sidewall 35 and the downwardly facing surface of the back wall 55, in some embodiments, leaving a narrow space between the housing of the device 10 and the surface on which the device is placed, allowing dispersion of some sound energy in lateral directions away from the microphone port. For example, the downwardly facing surface 37 of the sidewall 35 can be configured to sit above the surface along a majority of its length from the throat region to the mouth.

A ring 34 is disposed in the speaker port and has a ring surface configured to form a transitional volume from the speaker into the throat region of the horn assembly. The speaker can comprise a diaphragm and a phase plug, in which the phase plug has an aperture or apertures opening into the speaker port. The ring 34 can be disposed around a perimeter of the phase plug, and have a smooth outside surface defining an inside wall of the horn assembly at the speaker port.

As illustrated in the perspective view of FIG. 2, the speaker port 33, the back wall 55, the surface 38, and the first and second sidewalls 35, 36 combine with the surface on which the device is to be placed to form a speaker horn, which preferably has a continuously increasing volume from the throat region proximal to the speaker port 33, to the mouth 16. For the purposes of description of the volume of a speaker horn formed by the horn assembly and the surface on which the device is to be placed, the surface can be represented by a plane defined by the set of points (e.g. surface pads 40, 41, 42, 45, foot 31) on the housing designed to contact the surface on which the device is placed.

In this example, it is seen that the first and second sidewalls 35, 36 are separated by a distance proximal to the speaker port that is less than the separation distance proximal to the mouth 16. Also, the first and second sidewalls have heights proximal to the speaker port 33 that are less than the heights proximal to the mouth 16. The ring 34 in the speaker port serves to smooth the transition from the downward facing speaker into the horn assembly, and reduces discontinuities that can impact the audio characteristics including the frequency response of the speaker and horn assembly.

Figure 3:
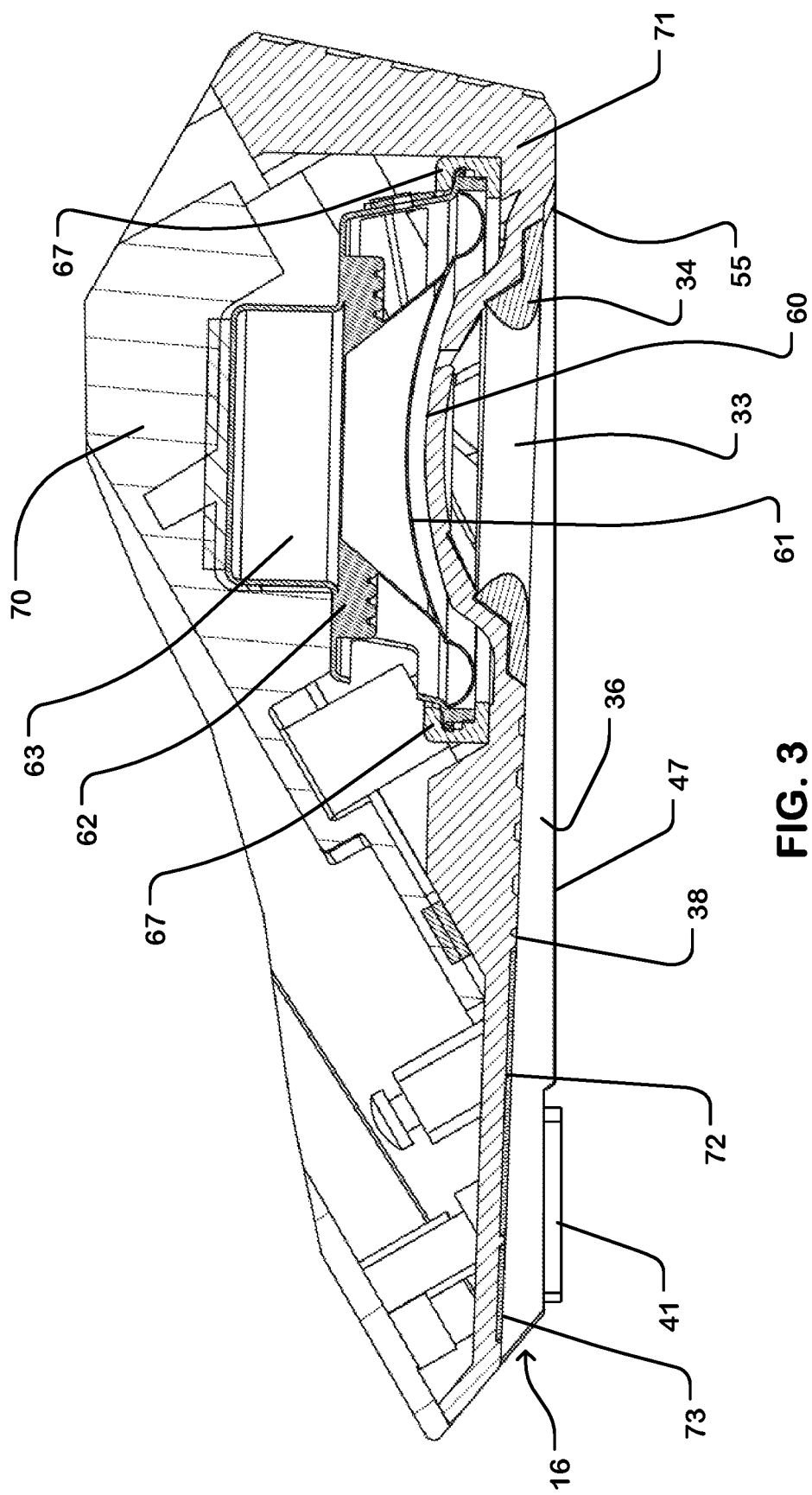
FIG. 3 is a cutout cross-section of the equipment of FIG. 1 showing an arrangement of a down-firing speaker with a horn assembly.

FIG. 3 is a cross-section of the housing of the device of FIGS. 1 and 2 in the region of the down-firing speaker and the horn assembly. The illustrated structure includes the housing structural members 70, 71 on which a speaker is disposed including a magnet 63, a voice coil 62, and a diaphragm 61. The speaker has an axis that is slanted by a few degrees relative to normal of the surface on which it is to be placed, which orients the speaker to project sound primarily downwardly, but with a slightly forward facing vector component into the horn assembly.

The speaker is coupled by a vibration damping gasket 67 to the housing structural members 70, 71. In this example, the speaker includes a phase plug 60 having an aperture or multiple apertures which open into the speaker port 33. Ring 34 which is comprised of material having a smooth curved surface is disposed around the periphery of the phase plug 60, defining an inside wall of the horn assembly at the speaker port and defining a transitional volume in the speaker port 33 downwardly into the speaker horn defined by the horn assembly. In some embodiments, the ring 34 is formed without substantial discontinuities on the ring surface opening into the speaker horn volume, where "without substantial discontinuities" means that the ring surface is tapered or curved so that there are no acute features on the surface exposed inside the speaker port and horn assembly.

In the side cross-section view, sidewall 36 of the horn assembly is shown, having a surface pad 41 disposed proximal to the mouth 16 of the horn assembly. The surface 38 of the horn assembly can be smooth, or have other textures. In the illustrated embodiment the surface 38 has shallow corrugation over a portion of the region, and smooth in regions 72 and 73. As mentioned above, in some embodiments, a surface pad (45 in FIG. 2) is disposed along a majority of the length of the downwardly facing surface 47 of the sidewall 36.

As illustrated, the height of the sidewall 36 proximal to the throat region of the horn assembly near speaker port 33 is less than the height of the sidewall 36 proximal to the mouth 16. The back wall 55 has a side surface inside the horn assembly that is slanted relative to the surface on which the device is to be placed. Likewise, the mouth 16 of the speaker horn formed by horn assembly in combination with the surface is framed by a slanted end of the sidewall 36 (and sidewall 35 not shown), an edge of the front portion 39 of the housing, and the surface on which the device is placed.

Figure 4:
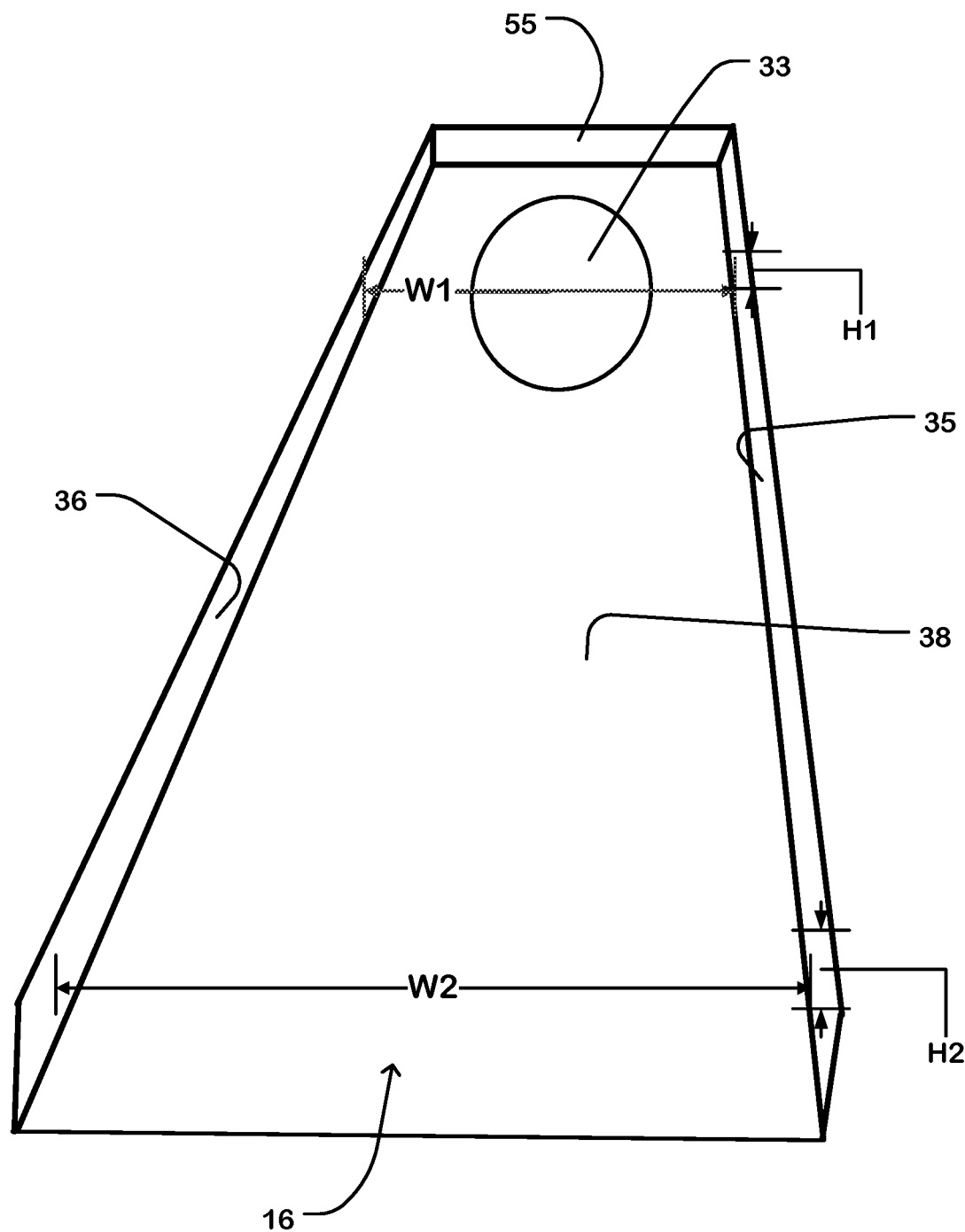
FIG. 4 is an illustration showing some relative dimensions of a horn assembly, like that shown in FIGS. 2 and 3.

FIG. 4 illustrates some of the dimensions of a horn assembly in an embodiment like that of FIG. 2. In FIG. 4, the sidewalls 35 and 36, back wall 55, and downward facing surface 38 of the horn assembly are illustrated schematically, showing a volume of a speaker horn formed by combination of the horn assembly and the surface on which the device is to be placed.

In the illustrated example, the sidewalls 35 and 36 have a width W1 proximal to the throat region of the horn assembly at the speaker port 33 in this example, and a width W2 proximal to the mouth 16 of the horn assembly. To form a speaker horn with a continuously increasing volume, the width W2 is greater than the width W1 in this example.

Also in the illustrated example, the sidewalls 35 and 36 have a height H1 proximal to the throat region of the horn assembly at the speaker port 33 in this example, at a height H2 proximal to the mouth 16 of the horn assembly. To form a speaker horn with a continuously increasing volume, the height H2 is greater than the height H1.

In other embodiments the configuration of the horn assembly can have other dimensions.

A technology is described suitable for implementation of a speakerphone or other desktop equipment, with a down-firing speaker and horn assembly that can provide improved quality audio performance. By deploying a horn assembly that forms a speaker horn in combination with the surface on which the device is placed, a pressure gradient created by the physical geometry can be leveraged to improve audio performance. This configuration can help focus sound towards users of the speakerphone, utilizing angled surfaces to create increasing pressure gradient and project audio. Also, the speaker horn can be configured to focus sound away from a microphone on the device, passively minimizing echo that can improve voice quality.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A desktop device, comprising:
a housing having a bottom side configured to face a surface on which the device is placed, a front side and a speaker port on the bottom side;
a down-firing speaker facing the speaker port on the housing; and
a horn assembly on the housing arranged to define a speaker horn, the speaker horn having a throat region proximal to the speaker port and a mouth proximal to the front side of the housing, and first and second sidewalls having proximal ends proximal to the speaker port and distal ends proximal to the mouth, the first and second sidewalls being separated by a first width W1 proximal to the speaker port, and the distal ends of the first and second sidewalls being separated by a second width W2 proximal to the mouth, where W2 is greater than W1.

2. The device of claim 1, wherein the speaker comprises a diaphragm and a phase plug, the phase plug having an aperture or apertures opening into the speaker port.

3. The device of claim 1, wherein first and second sidewalls have a first height H1 proximal to the speaker port, and the distal ends of the first and second sidewalls have a second height H2 proximal to the mouth, where H2 is greater than H1.

4. The device of claim 1, wherein the speaker comprises a diaphragm and a phase plug, the phase plug having an aperture or apertures opening into the speaker port; and including a ring disposed in the speaker port around a perimeter of the phase plug, the ring having a smooth outside surface defining an inside wall of the horn assembly at the speaker port.

5. The device of claim 1, wherein the horn assembly is arranged so that the speaker horn has substantially continuously increasing volume from the throat region to the mouth.

6. The device of claim 1, including a microphone and a microphone port, the microphone port being located on the housing in a position spaced laterally away from the horn assembly so that dispersion of acoustic energy in air from the speaker is diverted from the microphone port by a sidewall of the horn assembly.

7. The device of claim 1, including a microphone and a microphone port, the microphone port being located on the housing in a position spaced laterally away from the first sidewall.

8. The device of claim 7, wherein the first sidewall includes a surface pad configured to contact the surface along a majority of its length from the throat region to the mouth, and the second sidewall is configured to sit above the surface along a majority of its length from the throat region to the mouth.

9. The device of claim 1, wherein the speaker comprises a diaphragm and a phase plug, the phase plug having an aperture or apertures opening into the speaker port; and the horn assembly includes a ring in the speaker port having a ring surface facing the phase plug configured to form a transitional volume without substantial discontinuities on the ring surface opening into the speaker horn.

10. The device of claim 1, including a microphone, and a telephone connected to the microphone and the speaker.

11. The device of claim 1, including a microphone, and a telephone compatible adaptor connected to the microphone and the speaker.

12. A desktop device, comprising:
- a housing having a bottom side configured to face a surface on which the device is placed, a front side and a speaker port on the bottom side;
- a down-firing speaker facing the speaker port on the housing;
- a microphone port on the housing;
- electronics on the housing, including a speaker driver electronically connected to the speaker, and a microphone; and
- a horn assembly on the housing arranged to define a speaker horn in combination with said surface, a speaker horn having a throat region proximal to the speaker port and a mouth proximal to the front side of the housing, wherein the horn assembly comprises first and second sidewalls on the housing having proximal ends proximal to the speaker port and distal ends proximal to the mouth, the first and second sidewalls being separated by a first width W1 proximal to the speaker port, and the distal ends of the first and second sidewalls being separated by a second width W2, where W2 is greater than W1 proximal to the mouth, and the first and second sidewalls having a first height H1 proximal to the speaker port, and the distal ends of the first and second sidewalls having a second height H2 proximal to the mouth, where H2 is greater than H1.

13. The device of claim 12, wherein the speaker comprises a diaphragm and a phase plug, the phase plug having an aperture or apertures opening into the speaker port.

14. The device of claim 12, wherein the speaker comprises a diaphragm and a phase plug, the phase plug having an aperture or apertures opening into the speaker port; and including a ring disposed in the speaker port around a perimeter of the phase plug, the ring having a smooth outside surface defining an inside wall of the horn assembly at the speaker port.

15. The device of claim 12, wherein the horn assembly is arranged so that the speaker horn has substantially continuously increasing volume from the throat region to the mouth.

16. The device of claim 12, wherein the microphone port is located in a position spaced laterally away from the horn assembly so that dispersion of acoustic energy in air from the speaker is diverted from the microphone port by a sidewall of the horn assembly.

17. The device of claim 16, wherein the first sidewall includes a surface pad configured to contact the surface along a majority of its length from the throat region to the mouth, and the second sidewall is configured to sit above the surface along a majority of its length from the throat region to the mouth.

18. The device of claim 12, the horn assembly including a ring in the speaker port having a ring surface facing the phase plug configured to form a transitional volume without substantial discontinuities on the ring surface opening into the speaker horn volume.

19. The device of claim 12, wherein the housing includes a first upwardly facing portion having a user interface and a second upwardly facing portion having a tray configured to receive a mobile computing device, and wherein the speaker port is disposed beneath the first portion and the microphone port is disposed beneath the second portion.

* * * * *